United States Patent
Winkler

(10) Patent No.: US 7,171,105 B2
(45) Date of Patent: Jan. 30, 2007

(54) OPTICAL DEVICE WITH DUAL FUNCTION OF ILLUMINATION AND FORMING A FIGURATIVE IMAGE

(75) Inventor: Pascal Winkler, Saint-Blaise (CH)

(73) Assignee: Asulab S.A., Marin (CH)

( * ) Notice: Subject to any disclaimer, the term of this patent is extended or adjusted under 35 U.S.C. 154(b) by 0 days.

(21) Appl. No.: 11/289,530

(22) Filed: Nov. 30, 2005

(65) Prior Publication Data
US 2006/0083476 A1 Apr. 20, 2006

(30) Foreign Application Priority Data
Dec. 2, 2004 (EP) ................ 04028560

(51) Int. Cl.
G02B 6/10 (2006.01)
F21V 7/04 (2006.01)

(52) U.S. Cl. ............... 385/146; 362/610; 362/612

(58) Field of Classification Search ........ 362/602–605, 362/610, 612, 625, 811
See application file for complete search history.

(56) References Cited

U.S. PATENT DOCUMENTS

| 6,745,506 B2* | 6/2004 | Maas et al. ............ 40/546 |
| 6,752,505 B2 | 6/2004 | Parker et al. |
| 6,966,684 B2* | 11/2005 | Sommers et al. ........ 362/604 |
| 6,981,791 B2* | 1/2006 | Higashiyama ............ 362/600 |
| 2002/0145593 A1 | 10/2002 | Boyd et al. |
| 2002/0149925 A1 | 10/2002 | Epstein et al. |
| 2003/0206407 A1* | 11/2003 | Yang ...................... 362/27 |

* cited by examiner

Primary Examiner—Michelle Connelly-Cushwa
Assistant Examiner—Chris Chu
(74) Attorney, Agent, or Firm—Sughrue Mion, PLLC

(57) ABSTRACT

There is disclosed an apparatus having a display zone, such as a liquid crystal screen (4), and including an optical device for forming a decorative pattern in the form of a figurative image. The optical device for forming a figurative image includes an optical guide (1), at least partially superposed onto the display zone (4) and having two large faces (10, 11) and one lateral face (12). Optical extractors (20) each having at least one surface (21) for reflecting light are arranged in a first group in at least one of the large faces (11). A light source (8, 8a, 8b, 8c, 8d) is arranged so as to emit light in the direction of the reflective surfaces (21) via the lateral face (12) of the optical guide. Thus, each of the reflective surfaces causes a reflected light beam to be formed in a well defined direction, the set of the light beams forming a figurative image in that direction, which can typically be chosen to be the normal in relation to the mid-plane of the optical guide. The optical guide according to the present invention is further provided with a second group of optical extractors having a predefined position in relation to the display zone (4), for illuminating the latter, possibly in relation to the same light source as the first group of optical extractors.

12 Claims, 2 Drawing Sheets

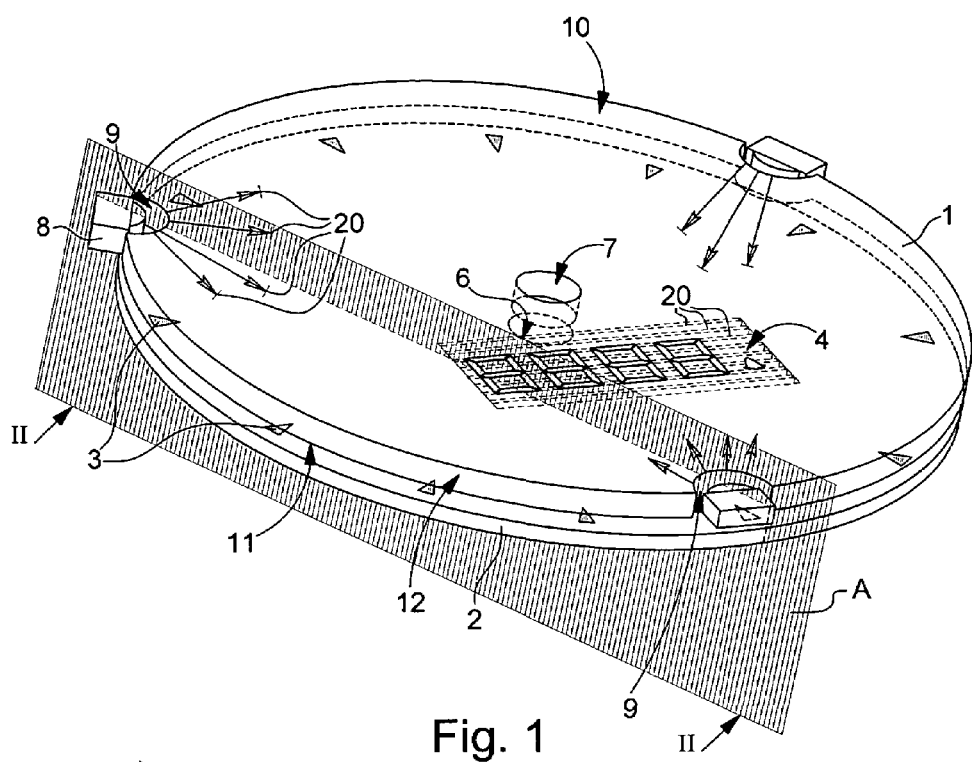
Fig. 1
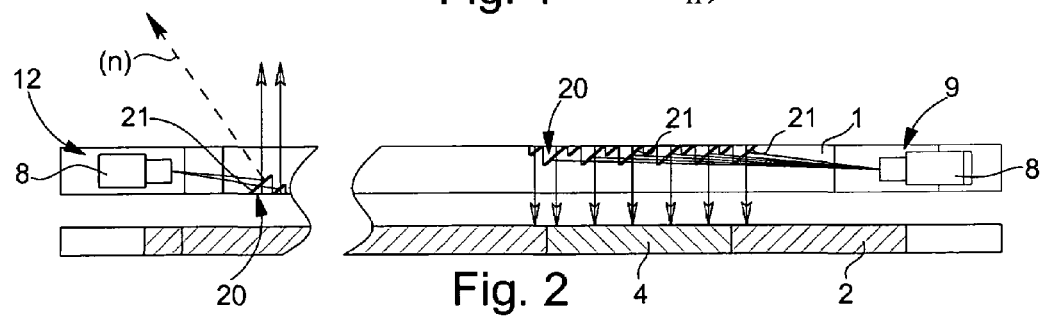
Fig. 2
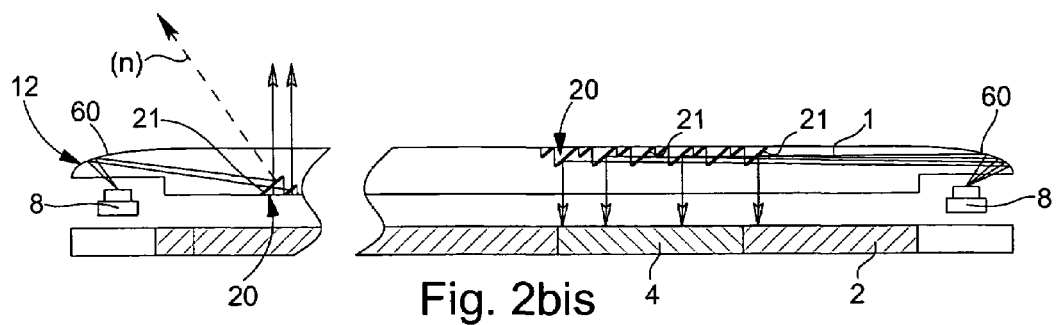
Fig. 2bis

OPTICAL DEVICE WITH DUAL FUNCTION OF ILLUMINATION AND FORMING A FIGURATIVE IMAGE

FIELD OF THE INVENTION

The present invention concerns an apparatus having at least one display zone and including an optical device comprising an optical guide one portion of which is arranged at least partially in superposition in relation to the display zone. The optical guide has two large faces and at least one lateral face, optical extraction means being arranged in the area of the optical guide portion arranged in superposition in relation to the display zone. The optical device further includes at least one light source arranged facing the lateral face in a predefined direction to emit light inside the optical guide and cooperate with the extraction means, to illuminate, at least partially, the display zone.

BACKGROUND OF THE INVENTION

Apparatus including devices of this type are known from the prior art. By way of example, U.S. Pat. No. 6,752,505 granted on $22^{nd}$ Jun. 2004 in the name of Solid State Opto Limited, discloses a transparent film used as an optical guide for diffusing light homogenous from a quasi-punctual light source. In accordance with this document, optical elements are arranged in the optical guide, possibly randomly, to extract light and direct it to a liquid crystal type display (LCD). The main object of the document is to obtain homogenous illumination with the best possible yield from the light emitted by the light source, the illumination obtained exhibiting a good compromise between clarity and softness, due to optimised diffusion. This patent discloses how diffusion can be optimised because of the distribution of the optical light extraction elements over the entire surface of the optical guide, as a function of the available light sources and the surface to be illuminated.

This type of system can be implemented for lighting an LCD, either by front lighting or backlighting without leading to an excessive thickness of the display device thereby formed. However, the aforementioned document does not provide any other application or use for this type of device.

SUMMARY OF THE INVENTION

It is the main object of the present invention to improve known solutions of the prior art by providing an optical device, particularly for a portable apparatus, that on the one hand, illuminates a display zone and, on the other hand, display a luminous decorative pattern, without increasing the structural complexity and therefore the manufacturing cost of the corresponding optical device.

Thus the invention provides, in particular, an apparatus of the aforementioned type characterized in that the optical guide further includes at least a first group of optical extractors arranged in one of the large faces. Each of the optical extractors has predefined geometrical features, including at least one light extraction surface. This group of optical extractors is for extracting light from the optical guide to form a figuration image in a similar direction to the direction along which the display zone is visible. The figurative image is defined directly as a function of the geometric features of the optical extractors, particularly because of interactions of the light with the extraction surfaces.

Owing to these particular features, the optical guide of the apparatus according to the present invention enables a luminous figurative image to be formed in addition to performing its basic function of illuminating a display zone of the apparatus. The figurative image formed can be of simple ludic, aesthetic or decorative interest or it can be utilised to provide information to the user of the apparatus.

Preferably, the optical extraction means for illuminating the display zone are also optical extractors each including at least one extraction surface and arranged in a second group.

The extractors can be made to extract the light from the optical guide by refraction or, preferably, by reflection.

Examples of applications for which the invention is of particular interest, are cases in which the apparatus of the present invention is a portable electronic apparatus, of the electronic watch, portable telephone or camera type, such electronic apparatus being advantageously provided with an LCD type display screen.

Thus, in these particular cases, implementation of the present invention enables the LCD screen to be illuminated, on the one hand, and a figurative image to be formed, on the other hand, while providing only one optical guide and, possibly only one light source. In the case of an exclusively analogue display watch, the present invention can also be implemented for illuminating the dial.

In a preferred embodiment, the first group of optical extractors for forming a figurative image is implemented to display information relating to the operation of the apparatus. In the case of a watch, a bell-shaped symbol can be displayed to indicate the operation of an alarm mode, for example. In the case of a telephone or a camera, the optical extractors can be implemented to indicate the functions of control members, the latter be made of an optically transparent material.

A large number of variants of the aforementioned apparatus can advantageously be provided.

In particular, a multi-coloured figurative image can be formed by implementing a plurality of groups or networks of extractors in the optical guide, each group of extractors being associated with its own light source.

Moreover, animations can also be displayed in a single colour or multi-coloured, on the basis of the above variant, by powering the light sources sequentially.

The various groups of extractors can be arranged in different areas of the optical guide or be interlaced in the same area. Alternatively, or by way of complement, two or more optical guides could be superposed, each of the optical guides carrying at least one group of extractors.

Other variants will be discussed in the following detailed description.

BRIEF DESCRIPTION OF THE DRAWINGS

Other features and advantages of the present invention will appear more clearly upon reading to following detailed description of a particular embodiment, made with reference to the annexed drawings, given by way of non-limiting example and in which:

FIG. 1 shows an exploded perspective and schematic view of the display means of an analogue timepiece according to a first preferred embodiment of the present invention;

FIG. 2 shows a cross-section of the elements shown in FIG. 1, and

FIG. 2b is is a similar view to that of FIG. 2 which shows an alternative embodiment in which the light source is oriented orthogonally to one of the large faces of the light guide;

DETAILED DESCRIPTION

Figures 3A, 3B:
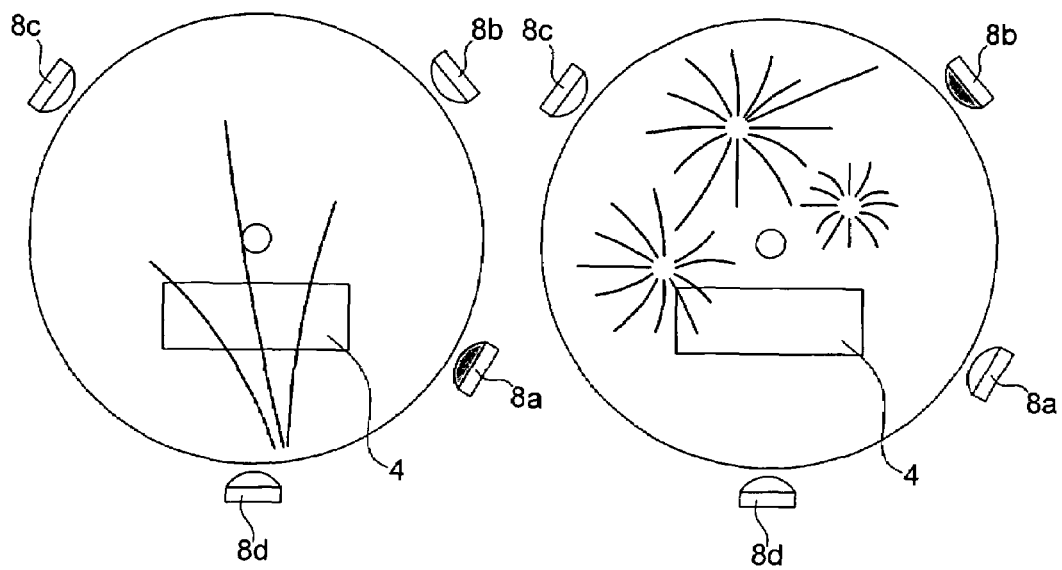
FIGS. 3a, 3b, 3c and 3d show schematically an example of images formed in succession to define an animation.

FIGS. 1 and 2 show schematic views respectively in perspective and cross-section of an optical guide 1 according to the present invention.

FIG. 1 shows a possible arrangement of optical guide 1 in a timepiece, namely between dial 2 and the display hands, which are not shown for the sake of simplification. Dial 2 is of a conventional type and is provided with hour symbols 3 for indicating the position of the hours, and a substantially rectangular aperture that allows an LCD type screen 4 to appear.

The dial and the optical guide each include a central aperture 6, respectively 7, allowing the passage of the drive means for the hands, i.e. the hour wheel and the cannon-pinion, which are not shown.

In the embodiment shown in FIG. 1, optical guide 1 operates in collaboration with three diodes 8, which can be identical or of different colours, for the purpose, on the one hand, of forming a luminous figurative image that is visible above dial 2 of the timepiece, and, on the other hand, of illuminating LCD screen 4.

From the point of new of the basic principle, a single diode 8 is sufficient to form, in association with a network of optical extractors as described hereinafter, a figurative image. Moreover, this single diode could be sufficient to ensure the illumination of LCD screen 4 simultaneously.

Preferably, the optical coupling between the light beam emitted by each of diodes 8 with optical guide 1 is achieved through an entry surface 9. In this example, the entry surfaces 9 each have substantially the shape of a cylindrical portion, such that the beams emitted by the diodes are refracted at the entry into the optical guide. Thus, the angular aperture of each of the light beams is increased to allow most of the surface of the optical guide to be covered.

Optical guide 1 has two main large faces 10 and 11 shown in FIG. 1 in substantially the form of discs, by way of non-limiting illustration, connected to each other by a generally ring-shaped lateral face 12. Light entry surfaces 9 are arranged in lateral surface 12.

The operating principle of the optical system described in relation to FIG. 1 is shown in a diagram in FIG. 2, in which the elements described hereinbefore are shown in cross-section, along a plane, marked by the letter A, intersecting two diodes 8 and two groups of optical extractors. Plane A contains the line II—II and intersects the two large faces 10 and 11 forming a right angle.

According to the present invention, optical guide 1 includes a plurality of optical extractors 20, arranged in a first group and arranged on large face 11 located on the side of dial 2.

Optical extractors 20, each of which has at least one reflecting surface 20, are distributed in a predefined network over large face 11, this network being defined to correspond to a precise figurative image, as explained hereinafter.

Reflecting surface 21 has a normal (n) oriented so as to face the corresponding diode 8, at a certain predefined angle. Thus, a certain proportion of the light beams emitted by diode 8 fall on reflecting surface 21, either in direct incidence, or after one or more prior reflections on at least one of large faces 10 and 11.

The proportion of light beams that interact with reflective surface 21 can be adjusted as a function of certain geometrical parameters of a given extractor, in particular as a function of the distance separating diode 8 from reflective surface 21 and the height of optical extractor 20 in relation to the thickness of optical guide 1. Those skilled in the art will not encounter any particular difficulty in adapting these parameters in accordance with requirements.

As regards the implementation means for illuminating LCD screen 4, optical extractors 20 are also arranged in a second group situated in immediate proximity to LCD screen 4. In the example shown in FIGS. 1 and 2, the group of optical extractors 20 provided for illuminating screen 4 is arranged above screen 4 and extends over a surface that is substantially larger than that occupied by the screen. The optical extractors are arranged regularly, with their respective reflective surfaces 21 all oriented to face diode 8 arranged at 6 o'clock. Those skilled in the art will not encounter any particularly difficulty in optimising the number, dimensions and position of the optical extractors of the second group to obtain efficient and homogenous illumination of the LCD screen, as a function of the features thereof.

However, as regards this particular embodiment of the present invention, all of the optical extractors of the first group, i.e. those provided for forming a predefined figurative image, have substantially the same angle in relation to large face 11. The result of this feature is that the light beams falling on reflective surfaces 21 of the network are all deviated in a same direction. Thus each reflecting surface 21 of the network form a reflected light beam. All of the reflected light beams form a light beam network giving rise to a figurative image in a given direction.

In the particular case shown in FIG. 2, the angle between reflective surface 21 and large face 11 is substantially 45 degrees, causing the formation of a figurative image in a direction substantially perpendicular to the large face. Thus, the person wearing the timepiece according to the invention can see a luminous image when he looks at the dial in a substantially normal direction, provided of course that diodes 8 are supplied with electric power.

Of course, the invention is not limited to forming a figurative image in a direction perpendicular to the dial. One could, for example, envisage forming the figurative image in a direction having an angle of the order of 60 degrees in relation to the dial, in the direction of the 6 o'clock position, to allow the user to see it without rotating his forearm to any great extent.

Generally, the direction in which the figurative image is formed is adjusted by the angle formed by the reflecting surface with respect to the incident light beams, the normal (n) of the reflecting surface corresponding to the bisecting line of the diode-reflecting surface direction on the one hand and the reflecting surface-observer direction on the other hand.

Optical guide 1 can be made of any material possessing the required qualities, including in particular transparency as regards light propagation, especially in the visible field. Preferably, the optical guide could be made of a plastic material of the PMMA type, by injection, replication, or by any other suitable method, the advantages of such solutions mainly residing in the corresponding easy manufacturing methods and in the low cost price of the product obtained.

After the preceding explanation, it will be understood that the reflecting surfaces 21 constitute a set of pixels for forming a figurative image. Consequently, the smaller the size of the reflecting surfaces, the better the image resolution and quality.

As already suggested, it should be noted that the higher the optical extractor, the larger its efficient surface and thus, the greater the quantity of light extracted from the optical guide at the corresponding location. Thus, as a result, the luminous intensity of each of the reflected light beams can be finely adjusted via the features of the corresponding optical extractor. On the basis of this adjustment, it becomes possible to form a "grey level" figurative image (in the colour of the diode used) on the basis of a single light source.

Using current manufacturing techniques, it is possible to envisage making optical extractors having dimensions of the order of 10 µm which makes them advantageously hard for the user of the apparatus to be seen when they are not illuminated. Moreover, the reflective surface 21 can have various shapes, flat or curved to modulate the form of the reflected beam and make it slightly divergent for example.

Preferably, the optical extractors belong to the same network having at least one common geometrical feature, namely that the normal to its reflecting surface is contained in a plane which is perpendicular both to optical guide land to the corresponding entry surface 9. This feature that is shown in a diagram in FIG. 1 guarantees that light extraction is optimum, which is more advantageous from the electric energy consumption point of view of the timepiece in which the light decoration of the present invention is implemented.

When the apparatus according to the present invention is implemented in the form of an electronic watch, the optical extractors of the first group can be arranged such that a figurative image symbolising a watch function is displayed. Indeed, by way of non-limiting example, in response to activation of a control member of the watch, an alarm mode could be activated and the alarm trigger time could be displayed for a certain amount of time on the LCD screen 4. In this case, the optical extractors could be arranged in a network such that while the alarm time is being displayed on LCD screen 4, a marking "AL" is displayed above a predefined area of the dial to indicate to the user the nature of the information being displayed on LCD screen 4. Alternatively, the optical extractors of the first group could be arranged so as to cause a figurative image to appear symbolising a bell.

Likewise, the marking "CHR" or a symbol showing a person running could be displayed to indicate to the user that LCD screen 4 is indicating a measured time, when the watch has a chronograph function.

When the apparatus according to the present invention is implemented in the form of a telephone or a camera, one face of the apparatus with an LCD type display could also have a certain number of control members. In this case, while the optical extractors of the second group are arranged in relation to the LCD display in order to illuminate the latter, the optical extractors of the first group can be arranged such that they form predefined figurative images on the control members. In the case of a telephone for example, one could envisage making the conventional markings of the keys used for dialling telephone numbers, particularly the numbers 0 to 9, in this manner. Any structural elements located between the optical guide and the keys must then be transparent so as not to prevent the passage of light beams reflected by the optical extractors. These features advantageously allow the telephone manufacturer to make a single dialling key model for a given telephone model, rather than individually marking the keys as is the case for current telephones. The preceding comments concerning the implementation of a telephone of course also apply in a similar way to the implementation of a camera.

Generally, those skilled in the art will be able to implement a number of light sources corresponding to his particular needs. In particular, a single light source could be used to illuminate both the optical extractors of the first group, to form a figurative image, and the optical extractors of the second group, to illuminate a display zone, without departing from the scope of the present invention.

The structure shown in FIG. 1, implementing an optical guide 1 illuminated by three light sources advantageously enables a multi-coloured image to be formed.

For this purpose, the light sources emit luminous radiations of different respective colours, each of the sources being associated with its own network of optical extractors.

According to a simple variant, each of the three optical extractor networks can be arranged in an area of optical guide 1 located in proximity to the diode 8 associated therewith, as shown in a diagram in FIG. 1.

Alternatively, each of the three networks could be spread over a large part of the total surface of the optical guide, and the networks could be interlaced. An example of a figurative image obtained with such a configuration is described hereinafter, in relation to the detailed description of FIGS. 3a, 3b, 3c and 3d.

Figures 3C, 3D:
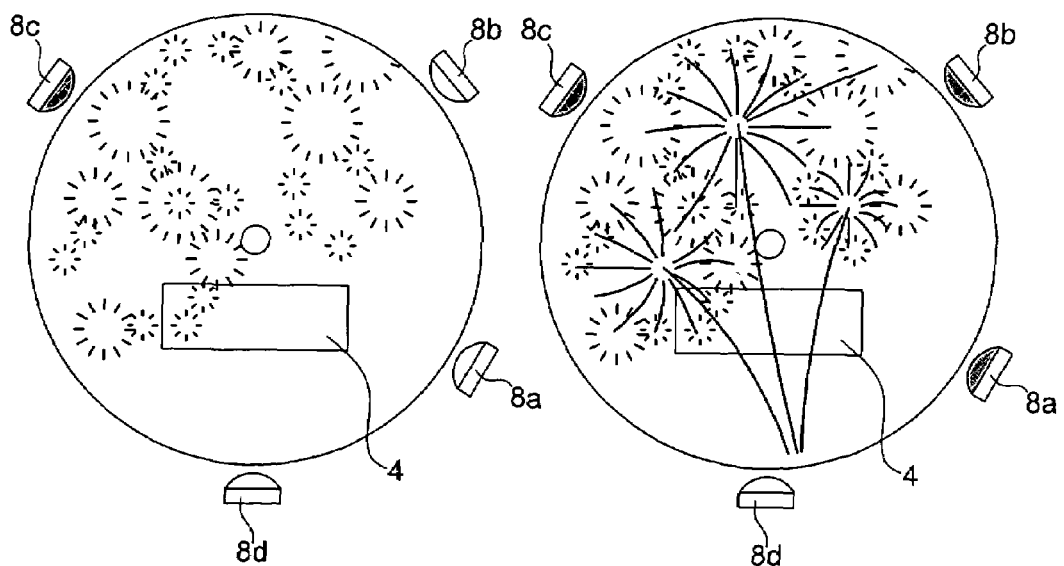

FIGS. 3a to 3c show schematically the figurative image formed by each of three optical extractor networks cooperating with a given light source.

The timepiece corresponding to the diagrams of FIG. 3 includes three diodes 8, arranged substantially opposite the 4 o'clock position (reference 8a in FIG. 3), 2 o'clock position (reference 8b) and 10 o'clock position (reference 8c). A fourth diode 8d is also shown, which illuminates LCD screen 4 in conjunction with the second group of optical extractors, the latter not being shown in FIG. 3 for the sake of clarity.

Each of diodes 8a, 8b and 8c is associated with a given optical extractor network. FIG. 3a shows the figurative image formed, as it appears to the person wearing the timepiece according to this embodiment, when diode 8a is being powered to emit light in the direction of the network associated therewith. Likewise, FIGS. 3b and 3c show the figurative images respectively formed when diodes 8b and 8c are operating. FIG. 3d shows the multi-coloured figurative image formed when the three diodes 8a, 8b and 8c are powered simultaneously.

A plurality of operating modes can be provided on the basis of this three-diode structure with three interlaced optical extractor networks.

For example, the electronic circuits of the watch according to the present invention can be programmed such that the three diodes 8a, 8b and 8c are powered simultaneously in response to activation of a control member by the user. The resulting function has an advantage beyond that of simple aesthetical improvement, in that the figurative image formed is luminous and can thus enable the person wearing the watch to see the position of the hands when he is in a dark environment.

Alternatively, or by way of complement, the electronic circuits of the watch can be programmed such that diodes 8a, 8b and 8c are powered sequentially in response to a different activation of the control member or in response to activation of an additional control member. It is of course clear that the present invention is not limited to the nature and operating modes of the control member or members.

By way of example, the three diodes could be powered simultaneously in response to a shock detected by an accelerometer arranged in the watch.

With a sequential type operating mode, a multi-coloured animation is displayed, namely a firework being lit in the example shown in FIGS. 3a to 3d.

FIG. 3a shows a diagram of the first figurative image of the animation obtained by the collaboration of the light beams emitted by the first diode 8a with a first optical extractor network. The person wearing the watch can see a luminous figurative image symbolising the trail left by rockets during a firework display from the top of the dial.

FIG. 3b shows a diagram of the display of the second figurative image of the animation, obtained by the collaboration of the light beams emitted by the second diode 8b with a second optical extractor network. The person wearing the watch can see a luminous figurative image symbolising the main explosions of the rockets lit in the first step of the firework display.

FIG. 3c shows a diagram of the display of the third figurative image of the animation, obtained by the collaboration of the light beams emitted by the third diode 8c with a third optical extractor network. The person wearing the watch can see a luminous figurative image symbolising the secondary explosions of the rockets.

Thus, when the three diodes 8a, 8b and 8c are powered sequentially, the person wearing the watch can see a firework being lit followed by two series of explosions.

Those skilled in the art will, of course, be able to provide different variants of the animation that has just been described without departing from the scope of the present invention. For example, following the display of the third figurative image of the animation described hereinbefore, the three diodes 8a, 8b and 8c could be powered simultaneously to form the complete firework image.

It should be noted that, in the embodiment shown in FIGS. 3a to 3d, the first and second group of extractors are partially superposed, which is made visible by certain portions of the patterns which partially cover LCD screen 4. In this case, those skilled in the art will not encounter any particular difficulty in arranging each of the optical extractors of a group such that the light beams that it reflects are not disturbed by one or several optical extractors of the other group.

Moreover, on the basis of the preceding description, a significant number of variants can be provided of the timepiece with a luminous pattern display according to the present invention.

By way of example, two optical extractor networks can be arranged on the same waveguide, wherein the directions of reflection of the light beams are different. In this case, two different figurative images are formed, visible from two different positions. According to an alternative embodiment, the angle between the two directions of reflection could be such that the two images formed make a stereogram when the observer's eyes are at a given distance above the optical guide, The preceding description corresponds to preferred embodiments of the invention and should in no way be considered limiting, particularly as regards the nature and structure described for the apparatus, especially the presence of an LCD screen, the nature and number of control members used or the position of the diodes. Likewise, the invention is not limited to the operating modes described and means used for the activation thereof insofar as these parameters can be altered by suitable programming of the control circuit. Those skilled in the art will not encounter any particular difficulty in adapting the operation of the apparatus according to the present invention to their particular requirements.

According to a variant shown in FIG. 2b is, a diode 8 is used for each light source, oriented orthogonally to a large face 11 of optical guide 1, i.e. the light source emits light rays directed generally vertically upwards, whereas in the embodiment shown in FIG. 2, diode 8 emits light rays directed generally orthogonally to the lateral face 12.

Diode 8 is arranged here underneath optical guide 1, still in proximity to lateral face 12. The entry surface 9 is parallel her to large faces 10, 11. Preferably, the peripheral portion 60 of the top large face 10 of optical guide 1 is curved towards bottom large face 11 such that the light rays, which are emitted by diode 8 towards the periphery of optical guide 1, can be totally reflected onto peripheral portion 60 and directed towards the reflective surfaces 20 associated with diode 8.

This variant enables top emitting diodes to be used for diodes 8, relative to the face of the printed circuit board on which they are mounted, as opposed to side emitting diodes.

Numerous variants can be implemented without departing from the scope of the present invention, such as not arranging a dial in the watch, the optical guide directly performing this function and, the drive trains for the hands being adapted to have an attractive appearance for the person wearing the watch. Moreover, the optical guide can of course be arranged under the display zone and illuminate the latter by transmission.

Moreover, the invention is not limited to the implementation of reflective type optical extractors. It will be noted in particular that refractive type optical extractors are also suitable for implementing a device illuminating a display zone. However, as regards the forming of figurative images, reflective type optical extractors are preferred since they offer greater flexibility, particularly from the point of view of the exit angle of the light beams from the optical guide.

Additional features could also be provided without departing from the scope of the present invention, such as for example covering the lateral face of the optical guide with a reflective coating, outside the entry surfaces, to limit losses of light due to light beams reaching the lateral face and being liable to leave the optical guide.

What is claimed is:

1. An apparatus having at least one display screen forming a display zone and comprising an optical device including an optical guide one potion of which is at least partially superposed in relation to said display screen, said optical guide having two large faces and at least one lateral face, said portion of the optical guide including optical extraction means, said optical device further including al least one light source arranged in proximity to said lateral face and oriented in a predefined direction to emit light inside said optical guide and to cooperate with said extraction means in order to illuminate, at least partially, said display screen, wherein said optical guide further includes at least one first group of optical extractors arranged in one of said large faces and each having predefined geometrical features including at least one light extraction surface, said group of optical extractors extracting light outside said optical guide to form a figurative image in a similar direction to the direction along which said display screen is visible, said figurative image being defined directly as a function of said geometrical features, by the interaction of light on said extraction surfaces, wherein said optical extraction means are also optical extractors each having at least one light extracation surface and are arranged in a second group, and wherein said first and said second group of optical extractors are arranged in distinct areas of said optical guide.

2. The apparatus according to claim 1, wherein the light source is arranged facing the lateral face in a predefined direction for emitting light inside the optical guide and cooperating with the extraction means to illuminate, at least partially, the display zone.

3. The apparatus according to claim 1, wherein the light source is oriented in an orthogonal direction to one of the large faces.

4. The apparatus according to claim 1, wherein said optical extractors for forming said figurative image are arranged on one of said large faces which is opposite the large face through which light is extracted to form said figurative image, said extraction surfaces of said first group being reflective surfaces.

5. The apparatus according to claim 4, wherein said optical extractors of said second group are arranged on one of said large faces which is the farthest from said display zone, each of said optical extractors of said second group also having at least one reflective surface.

6. The apparatus according to claim 1, wherein said first and second groups of optical extractors are arranged in superposed areas of said optical guide.

7. The apparatus according to claim 1, wherein said optical device includes an additional light source directed into said optical guide so as to interact with said first group of optical extractors whose optical extraction surfaces are oriented differently from said optical extraction surfaces of said second group of optical extractors.

8. The apparatus according to claim 1, wherein said display zone is a liquid crystal display screen.

9. An apparatus having at least one display zone and comprising an optical device including an optical guide one portion of which is at least partially superposed in relation to said display zone, said optical guide having two large faces and at least one lateral face, said portion of the optical guide including optical extraction means, said optical device further including al least one light source arranged in proximity to said lateral face and oriented in a predefined direction to emit light inside said optical guide and to cooperate with said extraction means in order to illuminate, at least partially, said display zone, wherein said optical guide further includes at least one first group of optical extractors arranged in one of said large faces and each having predefined geometrical features including at least one light extraction surface, said group of optical extractors extracting light outside said optical guide to form a figurative image in a similar direction to the direction along which said display zone is visible, said figurative image being defined directly as a function of said geometrical features, by the interaction of light on said extraction surfaces, wherein said optical extraction means are also optical extractors each having at least one light extraction surface and are arranged in a second group, said apparatus being a mobile telephone including a display and control members for dialing that are at least partially transparent and arranged on one face of said telephone, said display being illuminated by said optical extractors of said second group whereas markings carried by said control members are formed by the reflection of light on said optical extractors of said first group.

10. An apparatus having at least one display zone and comprising an optical device including an optical guide one portion of which is at least partially superposed in relation to said display zone, said optical guide having two large faces and at least one lateral face, said portion of the optical guide including optical extraction means, said optical device further including al least one light source arranged in proximity to said lateral face and oriented in a predefined direction to emit light inside said optical guide and to cooperate with said extraction means in order to illuminate, at least partially, said display zone, wherein said optical guide further includes at least one first group of optical extractors arranged in one of said large faces and each having predefined geometrical features including at least one light extraction surface, said group of optical extractors extracting light outside said optical guide to form a figurative image in a similar direction to the direction along which said display zone is visible, said figurative image being defined directly as a function of said geometrical features, by the interaction of light on said extraction surfaces, wherein said optical extraction means are also optical extractors each having at least one light extraction surface and are arranged in a second group, said apparatus being an electronic watch including a dial at least partially illuminated by said second group of optical extractors whereas said first group of optical extractors is implemented for displaying a predefined figurative image in one area of said dial.

11. An electronic watch according to claim 10, wherein said dial has at least one portion dedicated to a liquid crystal type display, said liquid crystal display being illuminated by said second group of optical extractors.

12. The electronic watch according to claim 10, wherein said figurative image symbolises a particular operating mode of said electronic watch, said optical extractors of said first group being illuminated when said operating mode is activated.

* * * * *